Oct. 29, 1940.     O. F. QUARTULLO     2,219,601
AUTOMOTIVE VEHICLE CONTROL CONNECTION
Filed May 4, 1939     6 Sheets-Sheet 1

INVENTOR:
ORPHEUS F. QUARTULLO
BY
ATTORNEY

Oct. 29, 1940.  O. F. QUARTULLO  2,219,601
AUTOMOTIVE VEHICLE CONTROL CONNECTION
Filed May 4, 1939  6 Sheets-Sheet 2

INVENTOR:
ORPHEUS F. QUARTULLO
BY
ATTORNEY

Oct. 29, 1940.  O. F. QUARTULLO  2,219,601
AUTOMOTIVE VEHICLE CONTROL CONNECTION
Filed May 4, 1939  6 Sheets-Sheet 3

INVENTOR:
ORPHEUS F. QUARTULLO
BY
ATTORNEY

Oct. 29, 1940.  O. F. QUARTULLO  2,219,601
AUTOMOTIVE VEHICLE CONTROL CONNECTION
Filed May 4, 1939  6 Sheets-Sheet 4

INVENTOR:
ORPHEUS F. QUARTULLO
BY
ATTORNEY

Oct. 29, 1940.  O. F. QUARTULLO  2,219,601
AUTOMOTIVE VEHICLE CONTROL CONNECTION
Filed May 4, 1939  6 Sheets-Sheet 5
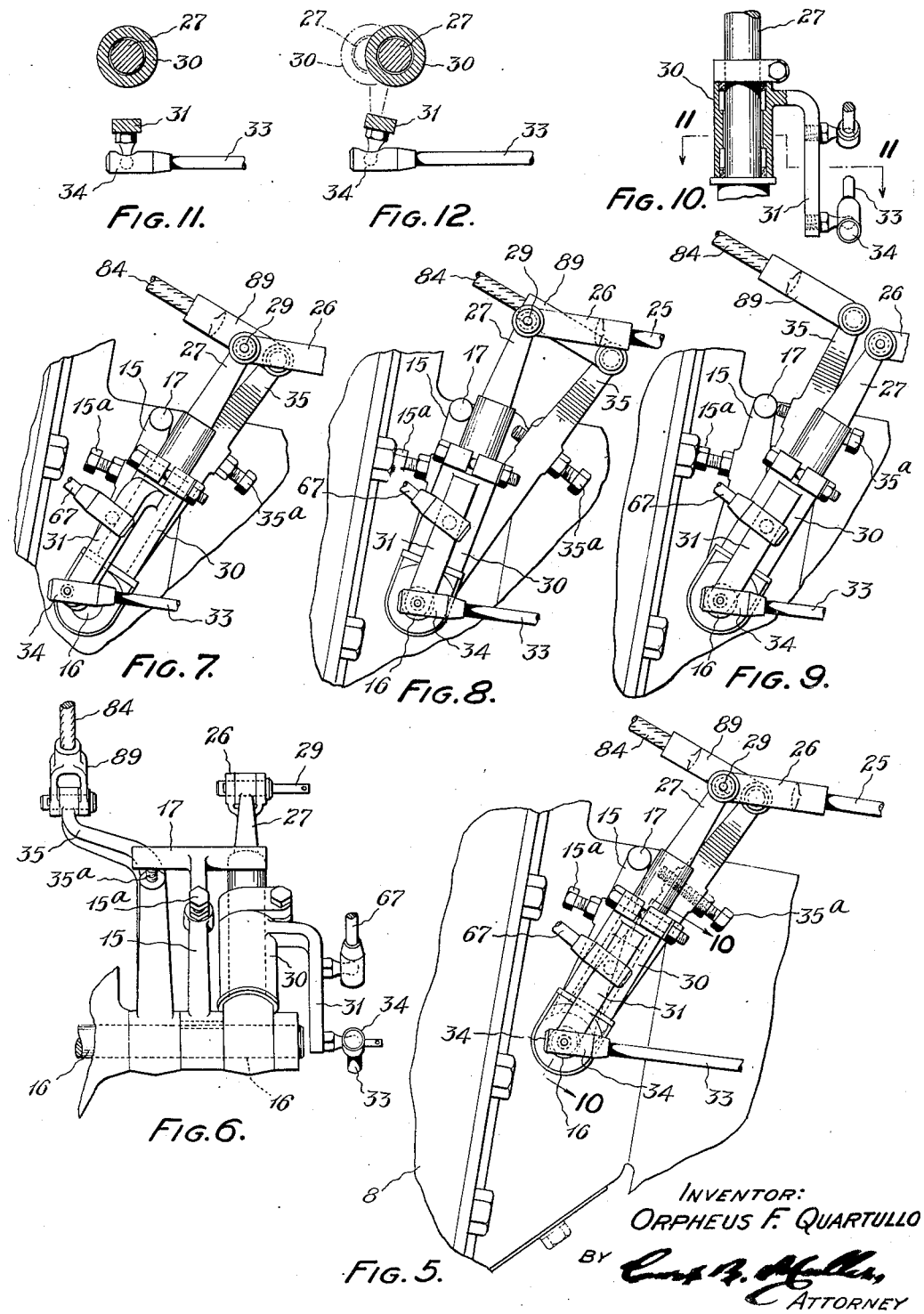
INVENTOR:
ORPHEUS F. QUARTULLO
BY
ATTORNEY

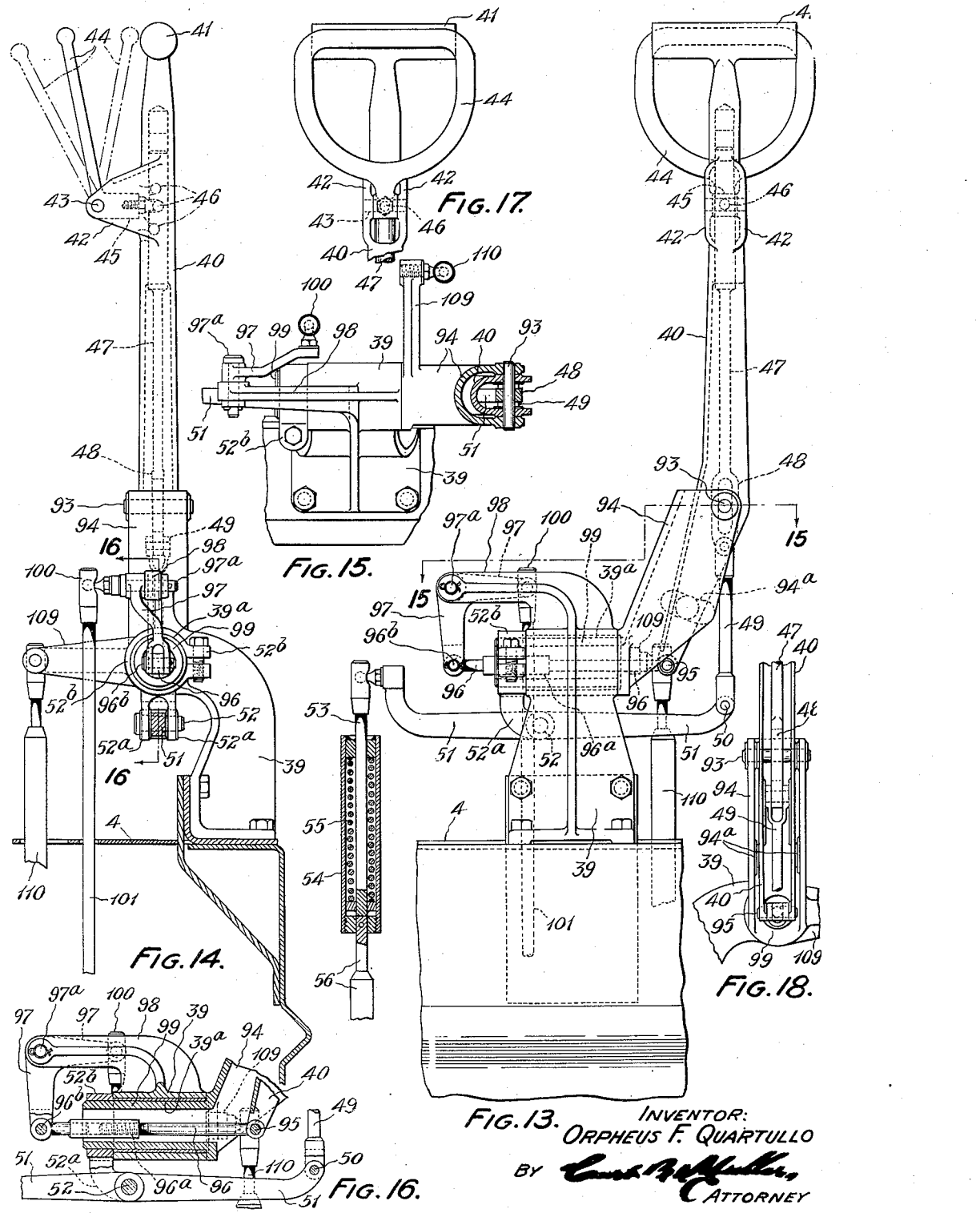

Patented Oct. 29, 1940

2,219,601

UNITED STATES PATENT OFFICE 2,219,601

AUTOMOTIVE VEHICLE CONTROL CONNECTION

Orpheus F. Quartullo, Cleveland Heights, Ohio, assignor to The White Motor Company, Cleveland, Ohio Application May 4, 1939, Serial No. 271,765

11 Claims. (Cl. 180—77)

This invention relates broadly to automotive vehicles and more specifically to improvements in the control mechanisms therefor.

In detail the invention comprehends a dual control unit designed to facilitate the operation of the clutch and speed change gears in a power transmission mechanism which is disposed in remote relation to the control members for the machine. The commercial automobile, illustrated herein as one exemplification of a structure of this type, comprises generally a body having a cross passage therein intermediate the wheels and below the plane of the axles, an engine, a transmission and axle assembly, rearward the cross passage with a gear shift and clutch control unit disposed forward said passage. The body of the vehicle is constructed to facilitate the operation thereof by a driver in a standing position, the clutch and gear shift pedals of conventional form being eliminated in the instant case and supplanted by a control unit embodying the present invention. Vehicles of this character have attained popularity in such delivery service as necessitate frequent stops, access to the truck from either side thereof and the elimination of control members in the cross aisle.

One of the objects of the invention resides in the provision of a remote control mechanism which will accommodate the operation of the gear selector in a transmission and the actuation of the sliding gears therein.

Another object of the invention is to provide a power actuated clutch release mechanism which is designed as a structural part of the transmission control lever and coordinated for concurrent use therewith.

Another object of the invention is to provide a series of levers and links for transmitting the movement imparted by the control members around the cross passage in a vehicular body and to the clutch and transmission gearing.

A further object of the invention is to provide linkage intermediate the brake lever and the clutch operating mechanism which is adapted to effect the release of the clutch upon application of the brake.

Another object of the invention resides in the novel construction of parts associated with the gear shift lever and the organization of such parts within the machine to effect directional changes in movement of the members connected therewith.

Another object of the invention is to provide a power actuated clutch release mechanism and a remote control member therefor, the latter being supported on the gear shift lever and arranged for operation by one hand of the driver.

Other objects and advantages more or less ancillary to the foregoing and the manner in which all the various objects are realized will appear in the following description, which considered in connection with the accompanying drawings, sets forth the preferred embodiment of the invention.

Referring to the drawings wherein the preferred embodiment of the invention is illustrated:

Fig. 5 is an enlarged detailed side elevational view of a fragmentary portion of the clutch operating member;

Fig. 6 is a front elevational view of the clutch operating member illustrated in Fig. 5;

Fig. 7 is an elevational view of the clutch operating member illustrating the position of certain parts thereof after the initial movement of the clutch actuating latch;

Fig. 8 is an elevational view of the clutch operating member illustrating the position of the parts thereof when the clutch is fully disengaged;

Fig. 9 is a similar elevational view of the clutch operating mechanism showing the relation of the parts therein after the clutch operating arm has been actuated to the position in which the clutch is disengaged by movement of the brake lever;

Fig. 10 is a vertical section through the clutch operating member illustrating the journalled support of the lever arm therein, the section being taken on a plane indicated by the line 10—10 in Fig. 5;

Fig. 11 is a transverse section through the arm, the section being taken on a plane indicated by the line 11—11 in Fig. 10;

Fig. 12 is a view similar to that of Fig. 11 illustrating the arm and associated linkage in an actuated position;

Fig. 13 is an enlarged rear elevational view of the dual control unit for operating the clutch release mechanism and transmission gears;

Fig. 14 is a side elevational view of the control unit illustrated in Fig. 13;

Fig. 15 is a transverse section of the control unit, the section being taken on a plane indicated by the line 15—15 in Fig. 13;

Fig. 16 is a vertical section through a fragmentary portion of the control unit, the section being taken on a plane indicated by the line 16—16 in Fig. 14;

Fig. 17 is a front elevational view of the upper portion of the control unit; and Fig. 18 is an end elevational view of the lower portion of the control unit shown in Fig. 13.

The vehicle chosen herein for the purpose of illustrating one of the embodiments in which the present invention may be used is of the form disclosed in my copending application, Serial No. 267,538, filed April 13, 1939. A detailed description of the vehicle is therefore deemed unnecessary apart from such general reference to the parts thereof as are necessary for a complete understanding of the invention.

Figure 1:
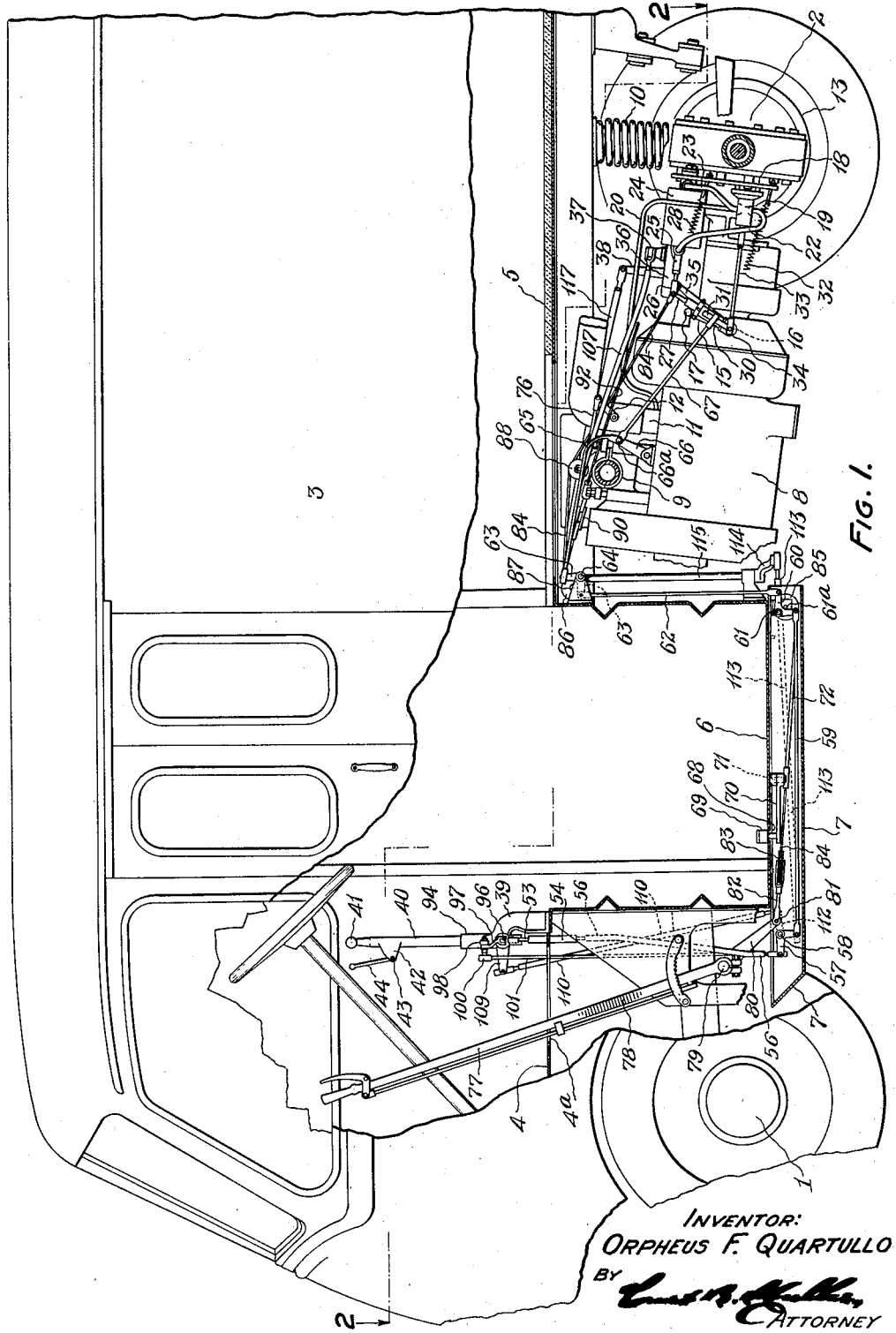
Fig. 1 is a side elevational view of an automobile embodying the present invention, certain portions of the body being broken away to illustrate the arrangement of control mechanisms and the relation thereof to the driving members of the vehicle.

Referring first to Fig. 1, the vehicle comprises a front axle 1, rear axle 2, with a body 3 mounted thereon. The body is framed with load carrying platforms 4 and 5 disposed respectively over the wheels mounted on the front and rear axles. Intermediate the load carrying platforms and subjacent the plane of the axle assemblies there is a floor 6 extending across the vehicle and constituting an aisle or cross passage, which is arranged in relation to the top of the body to accommodate the operation of the vehicle by an operator in standing position.

Figure 2:
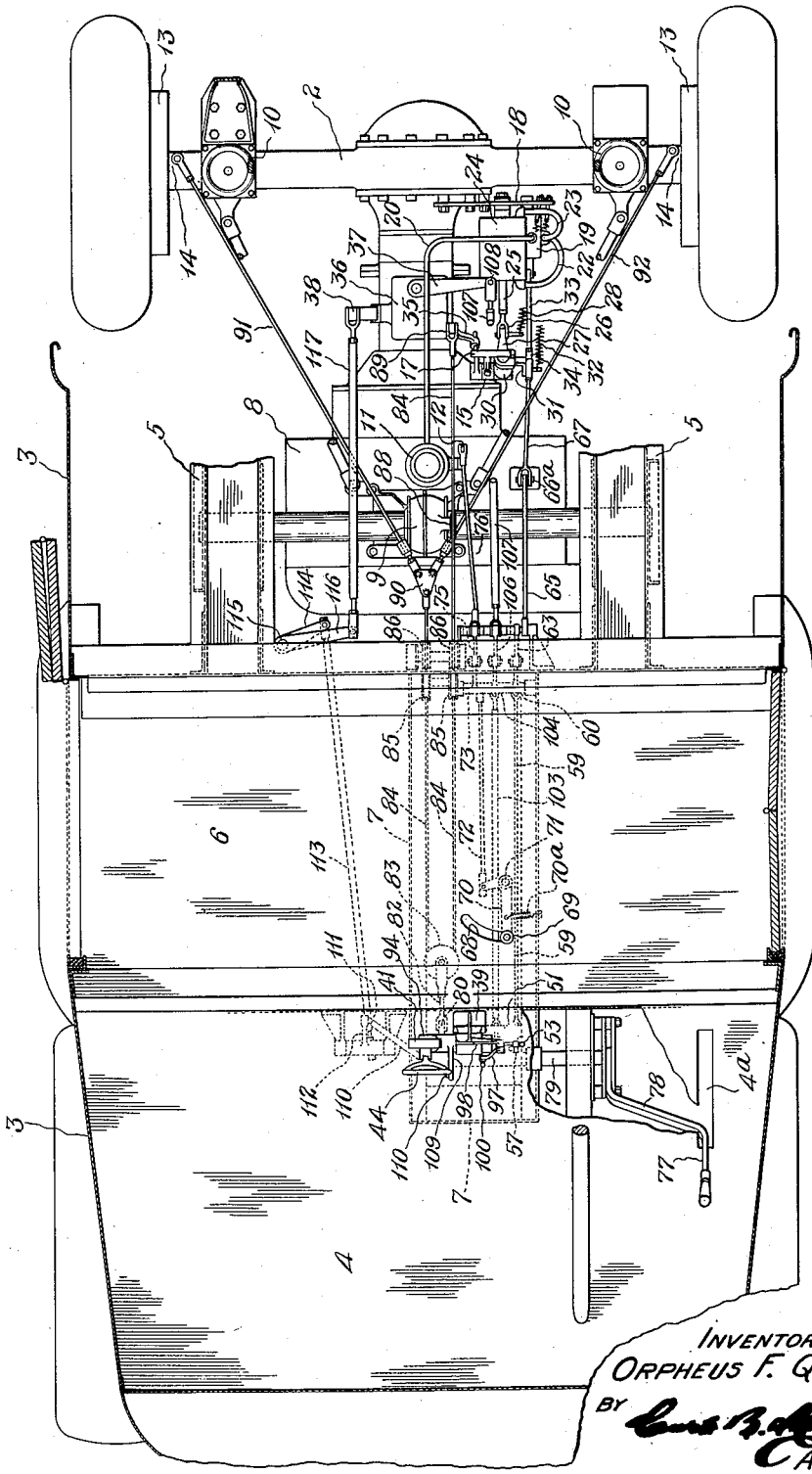
Fig. 2 is a transverse sectional view of the vehicle, the section being taken on a plane indicated by the line 2—2 in Fig. 1.
Figure 3:
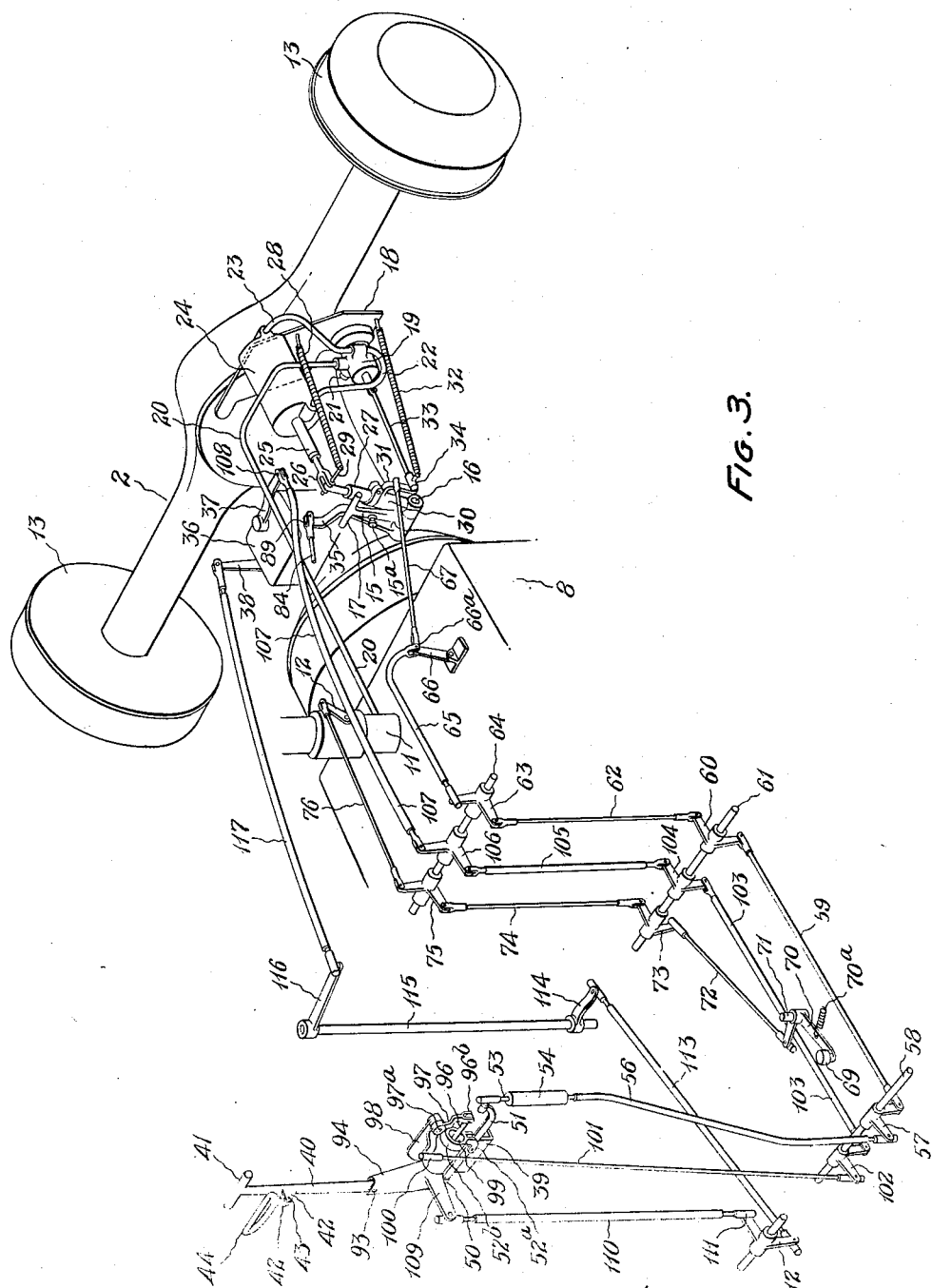
Fig. 3 is a diagrammatic view of the control connections illustrating the gear shift lever, transmission and clutch housing, the drawings further illustrating the fuel throttle linkage to the engine intake pipe.

Subjacent the floor 6 there is a channeled guard or under pan 7 constituting an encasement for the operating linkage between the control unit and power transmission mechanism. The power drive assembly which embodies the rear axle transmission and engine 8 is coupled through a universal joint 9 to the vehicular body subjacent the platform 5. The rearward portion of the body is supported by springs 10 mounted on the axle 2. As shown in Figs. 1, 2 and 3 the engine is provided with an intake manifold communicating with the carburetor, not shown, the intake manifold having a throttle 12 therein of the conventional form.

The rear wheels of the vehicle are provided with brake drums 13 having brake shoes actuated by a lever 14 of the usual type. A clutch, not shown, is disposed within a housing formed in the rearward portion of the engine casing, the actuating lever 15 therefor being affixed upon a shaft 16 coordinated with the spring release yoke of conventional form. The upper end of the clutch actuating lever 15 (Figs. 3, 4 and 6) is formed with a cross bar 17, the free end portions of which are arranged for abutting engagement with a pair of clutch and brake lever arms pivotally supported upon the shaft 16. Upon the rear axle housing there is a plate 18 having a valve 19 mounted thereon, the valve being provided with a tube 20 connected to the engine intake pipe 11 and in communication with the sub-atmospheric pressure therein which is induced by the pumping action of the pistons during the operation of the engine. The valve is formed with a vent 21 and is further provided with conduits 22 and 23 which lead respectively to the forward and rearward portions of a cylinder 24. The cylinder is provided with a piston connected with a rod 25 having a clevis 26 in the end portion thereof which is connected to a lever 27, the lower end thereof being pivotally mounted on the shaft 16.

Adjustment of the operating member for the valve 19 will establish vacuum control alternately through the tubes 22 and 23 to the opposed ends of the cylinder and thus effect the reciprocative movement of the piston. The plate 18 is pierced to accommodate the support of a spring 28 connected to an extended end portion of a pin 29 within the clevis 26, the spring being designed to effect the retraction of the piston in the cylinder 24.

As illustrated in Fig. 10, the lever 27 is formed with a flange adapted for the support of a sleeve 30 mounted for oscillatory movement thereon. The sleeve 30 is formed with a depending arm 31 having a spring 32 connected therewith. The opposed end of the spring is affixed to the plate 18 and constructed to normally urge the arm 31 rearwardly towards the axle. The lower end of the arm 31 is connected to a rod 33 through a ball and socket connection 34, the rod 33 constituting the control member for actuating the valve 19. The radius of movement of the arm 31 is designed to compensate the arcuate travel of the lever 27 about its fulcrum so that the translation of the rod 33 will be effective irrespective the position of the lever.

The transmission gear casing 36, as shown in Figs. 2 and 3, is provided with a lever 37 adapted (as is customary in devices of this type) to effect the engagement of the sliding gears therein. The transmission is also provided with a lever 38 mounted on the side of the gear casing adapted for operation, in the conventional manner, to effect the preselection of the gear to be entrained.

As shown in Figs. 1 and 13, the gear shift and clutch operating unit is mounted on the load carrying platform 4, the structure thereof comprising a bracket 39 formed with a cylindrical opening 39ᵃ therein constituting the bearing for an oscillatory frame which carries the gear shift lever 40. The lever 40 is formed with a cross bar 41 in the free end thereof, providing a hand grip for the operator. The lower portion of the lever is preferably of a channeled transverse section, the upper portion thereof contiguous the cross bar 41 being constructed with laterally disposed ears 42 which are cross drilled for the reception of a pin 43 constituting a fulcrum for a clutch releasing finger latch 44. The latch is generally of circular configuration having a flat lineal section therein which is disposed in parallel relation with the cross bar 41 on the lever 40. The lower portion of the finger latch is constructed with an arm 45 extending inwardly towards the medial axis of the lever and provided with a coupling 46 operatively engaged with a rod 47 guided within a bore in the upper portion of the lever 40. The lower end of the rod 47 is constructed with an enlarged section 48 which is slotted for the reception of a guide pin 93. The rod 47 is pivotally connected with a link 49 which is cross drilled to receive a pin 50 forming a pivotal connection between the link and a rocker arm 51. The arm is fulcrumed intermediate its ends upon a bifurcated boss 52ᵃ depending from a collar 52ᵇ mounted for oscillatory movement upon the outer end of the lever supporting frame. The oscillatory movement afforded through this construction facilitates the pivotal movement of the rocker arm 51 as the lever is rocked in a plane normal to the major axis of the rocker arm which occurs during the manipulation of the lever 40 when the lever is adjusted to effect the actuation of the gear selector control linkage. The opposed end of the rocker arm 51 is provided with a ball and socket connection interlinked with a rod 53 having a collar affixed upon the end thereof within a tube 54. The upper end of the tube is provided with a bushing affixed therein to form a bearing seat for a spring 55 disposed in telescopic engagement with the rod 53. The lower end of the tube is threaded for the reception of a plug having a rod 56 affixed thereto. The spring is designed to sustain the load necessary to effect the actuation of the clutch release valve actuating mechanism but to yield when excessive loads are applied thereon. The rod 56, as will be seen in Fig. 3, is connected with a bell crank 57 mounted on a shaft 58 disposed in the forward portion of the guard 7. The second arm of the bell crank is interlinked with a rod 59 connected to a bell crank 60 mounted on a shaft 61 in the rearward portion of the guard 7. The second arm of the bell crank is connected with a yoked rod 62 which in turn is connected to a third bell crank 63 mounted on a shaft 64 subjacent the load carrying platform 5. The bell crank 63 is coupled with a rod 65 formed with an arcuate end portion pivotally connected through a pin 66ª with a rocker arm 66 mounted on the engine. The pivot pin 66ª constitutes a supporting medium for a rod 67, the opposed end of the rod being coupled with the arm 31.

In operation, as the latch 44 is pulled towards the cross bar 41 the arm 45 will effect the downward translation of the rod 47, the elevation of the forward portion of the rocker arm 51 and in turn the elevation of the rod 56 through the medium of the spring 55. Such movement of the rod 56 will cause the oscillation of the bell cranks 57, 60 and 63, the translation of the rods 59, 62, 65, 67 and 33 and the consequent actuation of the valve 19 to effect the distention of the piston rod 25. As the lever 27 is rocked forwardly by the rod 25 it will impinge the cross bar 17 and oscillate the shaft 16 to a position where the clutch yoke carried thereby will compress the clutch spring and effect the release of the clutch. In the inoperative periods of the engine the clutch release may be effected by the application of sufficient physical effort to overcome the clutch spring. The linkage intermediate the latch 44 and the lever 27 is, however, safeguarded from undue strain by the spring 55 which is designed to support the loads necessary to effect the actuation of the valve and the effort of the clutch spring but to yield under abnormal loads such, for example, as occur when the clutch pilot bearing becomes galled for lack of lubrication.

As will be seen in Figs. 5 to 9, the pivotal connection of the member 34 is disposed in aligned relation with the medial axis of the shaft 16 so that no appreciable movement of the valve rod 33 will occur during the actuation of the lever 27.

As shown in Fig. 2, the floor 6 in the cross passage is formed with an arcuate slot 68 provided for the reception of a throttle control roller 69 mounted upon a bell crank 70 supported upon a stud 71 affixed to the lower face of the floor. The second arm of the bell crank 70 is pivotally connected with a rod 72 interlinked with a bell crank 73 mounted on the shaft 61. The second arm of the bell crank 73 is connected with a rod 74 pivoted upon a bell crank 75 mounted upon the shaft 64. The second arm of the bell crank 75 is connected with a rod 76 pivoted to the engine throttle lever 12 (Fig. 3). The bell crank 70 is provided with a contractile spring 70ª normally urging the linkage into the position in which the valve throttle is closed. The bell crank 70 is oscillated to open the throttle by a rotative movement of the operator's foot against the side of the roller 69. The advantage of the improved throttle control member over the conventional accelerator pedal of the vertically movable type resides in the provision of a structure which eliminates the possibility of accidental throttle movement by the operator while driving the vehicle in a standing position over a rough road. The structure further accommodates the actuation of the throttle while the driver is standing with his weight divided upon both feet.

Figure 4:
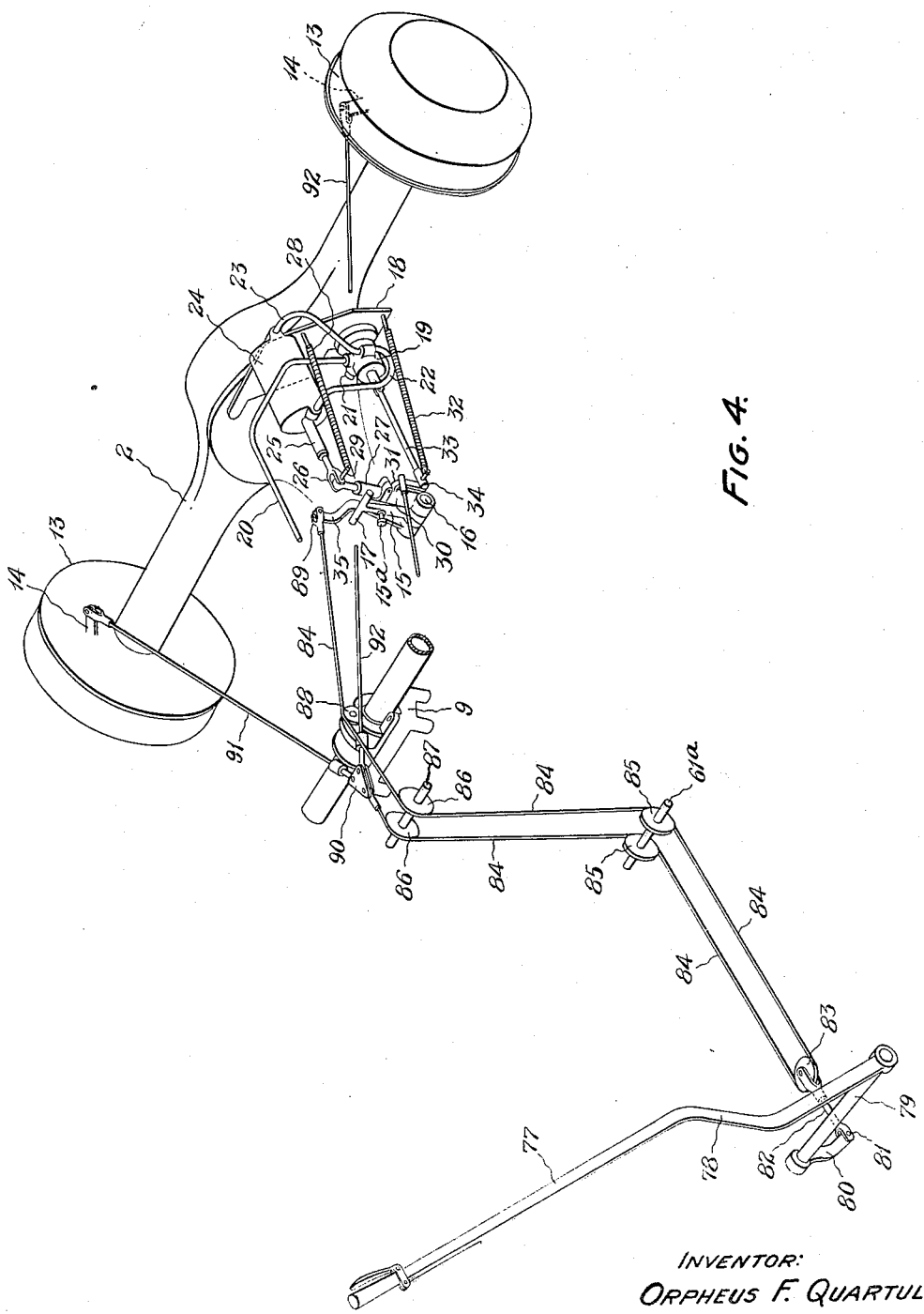
Fig. 4 is a diagrammatic view of the hand brake system including a portion of the clutch operating member associated therewith.

As shown in Figs. 1, 2 and 4, the hand brake lever 77 is disposed adjacent the gear shift control unit, the free end thereof projecting through a slot 4ª in the load carrying platform 4. The lever is formed with an offset portion 78, the lower end thereof being pivotally mounted upon a shaft 79 supported on the body chassis. The inner end of the shaft 79 is provided with a depending lever 80 having a clevis pin 81 in the end thereof which is connected for a pivotal movement with a forked link 82 carrying a sheave 83. As will be seen in Fig. 4, a cable 84 is trained over the sheave 83 and about a pair of pulleys 85 mounted upon the shaft 61ª within the guard 7 and further about a second pair of pulleys 86 loosely supported on a shaft 87 disposed subjacent the load carrying platform 5. One end of the cable 84 is further guided by a sheave 88 mounted on the tube supporting the universal joint 9, this portion of the cable being affixed to a clevis 89 pivotally connected to the lever 35 which as heretofore described is disposed for engagement with the cross bar 17 on the clutch lever 15. The other end of the cable 84 is connected with a triangular plate 90 which is drilled to support a pair of cables 91 and 92 connected with the brake levers 14. In operation, when the hand brake lever 77 is retracted, the sheave 83 will be moved forwardly, thus rocking the lever 35 upon its fulcrum into engagement with the cross bar 17 (Fig. 9) to effect the release of the clutch and simultaneous the application of the brakes.

As shown in Figs. 7 to 9, the lever 15 is constructed with an adjustable stop 15ª provided to limit the forward oscillatory movement thereof and the arm 35 is likewise provided with a stop 35ª to delimit the movement thereof in relation to the arm 15.

Referring now to Figs. 13 to 16, the gear shift lever 40 is pivotally mounted on a pin 93 supported in the upper portion of a channeled arm member 94 (Fig. 15). The lower end of the lever 40 is guided by pads 94ª formed on the inner faces of the arm 94. The end of the lever 40 is bifurcated and cross drilled for the reception of a pin 95 which supports a rod 96 disposed within a cylindrical portion of the arm 94 journalled in the bracket 39. The outer end of the rod 96 is pivoted upon a pin 96ᵇ mounted in an arm of a bell crank 97 fulcrumed upon a pin 97ª supported in the bracket 98 which is integral with and extends from the upper portion of the bracket 39. The cylindrical bearing portion 99 of the arm 94, which is journalled in the bracket 39, is restrained from longitudinal movement by a shoulder adjacent the inner end thereof and the collar 52ᵇ mounted for oscillatory movement upon the outer end thereof. The collar 52ᵇ is formed with ears 52ª which are cross drilled for the reception of a pin 52 constituting a pivotal support for the rocker arm 51. The other arm of the bell crank 97 supports a ball and socket coupling 100 (Fig. 14) connected with a depending link 101 having the opposed end thereof coupled with a bell crank 102 (Fig. 3) mounted for oscillatory movement upon the shaft 58. The second arm of the bell crank is pivotally connected to a rod 103 which is coupled with a second bell crank 104 pivoted on the shaft 61. The second arm of the bell crank 104 is connected with a rod 105, which is turn is connected to a third bell crank 106, the second arm thereof being coupled with a curved link 107 having a clevis 108 in the end thereof. The clevis 108 is pivotally connected to the lever 37, which effectuates the actuation of the sliding gears in the transmission case 36. The oscillatory movement of the lever 40 upon its fulcrum 93 effectuates the reciprocation of the rod 96, the vertical translation of the rod 101 and the consequent oscillation of the lever 37. Since the arm 94 is subject to oscillatory movement within the journal bearing 39 during the movement of the lever 40 in the gear selecting operation, a swivel connection is necessary between the pivotal connections 95 and 96ᵇ. Such movement is afforded by the rotatable connection 96ᵃ provided by the threaded engagement of the rod 96 with the sleeve constituting the coupling 96ᵃ.

The arm 94 is formed with a laterally extended boss 109 (Figs. 3, 14 and 15) having the end portion thereof pivotally connected with a depending rod 110 with a ball coupling 111 upon the end thereof which is coupled with a bell crank 112 interlinked with a rod 113. The rod 113 is pivoted to an arm 114 affixed upon the lower end of a vertically disposed shaft 115 having a lever 116 mounted upon the end thereof interlinked with a rod 117 pivoted to the gear selecting lever 38. When the lever 40 and arm 94 are oscillated about the axis of the journal bearing in the bracket 39 the arm or boss 109 will effectuate the vertical translation of the rod 110, the reciprocation of the rod 113, the oscillatory movement of the rod 115, the reciprocation of the rod 117 and the consequent oscillation of the lever 38. It will be obvious from the foregoing that the dual gear shift and clutch control unit may be manipulated by the operator of the vehicle with one hand, the forward, rearward and lateral movement of the gear shift lever being the same as that employed in the conventional gear shift lever in an automobile while the power actuated clutch release member may be concurrently operated through the finger latch 44 coupled therewith.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. An automotive vehicle comprising a combination of a wheeled carriage including a body provided with a cross passage having a low floor, a power-unit assembly including an engine, a clutch and a gear shift transmission rearwardly of said passage, a dual control mechanism forwardly of said passage, a fluid pressure connection between said mechanism and said clutch and a connection between said mechanism and transmission, said control mechanism including palm and finger grips adjustable by sequential single-hand operation for actuating said connections.

2. In an automotive vehicle, a body provided with a cross passage having a low floor, a rear driving assembly including an engine, a clutch, a speed-change transmission and a differential axle housing, a hollow pillar within said vehicle forwardly of said passage, a lever structure carried by said pillar for controlling the operation of both clutch and transmission and connections between said clutch and one element of said structure and between said transmission and another element of said structure respectively, said connections extending through said pillar and underneath said floor.

3. In an automotive vehicle, a clutch, a speed-change transmission, a hollow pillar within said vehicle, a pair of levers carried one by said pillar and the second one by the first for controlling the operation of said transmission and clutch and connections between said clutch and one of said levers and between said transmission and the other one of said levers, said connections extending through said pillar.

4. In an automotive vehicle, a clutch, a speed-change transmission, a hollow pillar within said vehicle, a pair of levers carried by said pillar in such proximity as to be adjustable with one hand for controlling the operation of said clutch and transmission respectively, a fluid-pressure assembly adapted to operate said clutch and connections respectively between said assembly and one of said levers and between said transmission and the other of said levers, each connection extending through said pillar.

5. In an automobile, in combination, a body provided with a cross passage having a low floor, a unitary power assembly including an engine, clutch, speed-change transmission and differential rear axle housing, a hollow pillar within said vehicle and forwardly of said passage and at the arm height of an operator standing in said passage, a pair of hand levers carried by said pillar for controlling the operation of said clutch and transmission respectively, a fluid pressure device, a connection between said device and one of said levers, said device adapted to release the clutch, and a connection between said transmission actuating lever and said transmission, two of said connections extending through said pillar and underneath the floor of said passage.

6. In a dual control for an automobile, a hollow pillar, a member formed with a hollow trunnion turnably mounted in said pillar, a hand lever pivoted on said trunnion member, a finger latch pivotally carried by said hand lever, a rock bar pivotally mounted intermediately of its ends on said trunnion, one end of said rock bar being connected with said latch and having its other end operatively connected with a clutch, a rod axially movable through said trunnion and having its one end articulated to said hand lever, the other end of said rod being operatively connected with one unit of a change speed gear transmission, said trunnion being provided with a projecting arm operatively connected with another unit in said transmission, whereby the hand lever may be swung bodily in a forward or rearward direction to swing said rock bar in unison with consequent turning movement imparted to said trunnion for selecting one speed after swing of the hand lever laterally has effected crossover of a gear of said transmission.

7. In a dual control for an automobile provided with a clutch and with a gear-shift transmission, a hollow pillar, a member formed with a hollow trunnion turnably mounted in said pillar, a hollow, upright double-armed hand lever pivoted at the junction of its arms on said trunnion member, a finger latch pivotally carried by the upper end of said hand lever, a rock bar pivotally mounted intermediately of its ends on said trunnion, one end of said rock bar being connected with said latch, means comprising a ball and socket connection at the other end of said bar and operatively joined with said clutch, a rod axially movable through said trunnion and having its one end articulated to the lower end of said hand lever, means for operatively connecting the other end of said rod with the crossover unit of said gear-shift transmission, said trunnion being provided with a projecting arm and means for operatively connecting the end of said arm with the selector unit of said gear-shift transmission, whereby the hand lever may be swung bodily in a forward or rearward direction to swing said rock bar in unison with consequent turning movement imparted to said trunnion for selecting one speed after swing of the hand lever laterally has effected crossover of a gear of said transmission.

8. In combination with an automobile transmission having a gear shift lever and a gear selector lever, a remote control unit therefor comprising, a bracket, an arm pivotally mounted therein, linkage connecting said arm and said gear selector lever, a gear shift control lever pivotally mounted on said arm, linkage supported by said bracket connecting said control lever with said gear shift lever and means in the last named linkage to accommodate the pivotal movement of said arm.

9. In an automotive vehicle embodying a clutch, a power actuating mechanism therefor and a transmission having a gear shift lever and a gear selector lever, a remote control unit therefor comprising, a pivotally supported arm, linkage operatively connecting said arm with said gear selector lever, a gear shift control lever pivoted upon said arm, linkage operatively connecting said control lever with said gear shift lever, a swivel connection in the linkage between the control lever and gear shift lever, a clutch release latch pivoted upon said control lever, linkage supported by said arm connecting said latch with the clutch power actuating mechanism, and means in the last named linkage associated with said arm to accommodate the pivotal movement thereof.

10. In an automotive vehicle embodying a transmission having a gear shift lever and a gear selector lever, a control unit therefor disposed in the forward portion of the vehicle, said unit comprising, an arm pivoted for forward and rearward movement in the vehicle, linkage operatively connecting said arm with said gear selector lever, a pivot pin in said arm, a gear shift control lever mounted thereon intermediate its ends for movement in a plane normal to the plane of movement of the arm, linkage operatively connecting said control lever with said gear shift lever, and means on said arm to restrain lateral movement of the control lever and relieve the strains imposed upon said pin when said arm is oscillated through manipulation of said control lever.

11. In an automotive vehicle embodying a body and a clutch and transmission assembly mounted thereon for independent movement relative thereto, a control unit for operating the clutch and transmission comprising, a bracket mounted on said body, an arm journalled therein, linkage mounted on said body and connected with said arm, a rod coupled with said linkage and a member in said transmission, a lever pivotally mounted on said arm, linkage mounted on said body and connected with said lever, a rod coupled with said linkage and a second member in said transmission, a latch pivotally mounted on said lever, linkage mounted on said body and connected with said latch, a rod coupled with said linkage and said clutch, and means coordinated with the linkage connected with the arm, lever and latch and the rods coupled respectively with the first named transmission member and the second named transmission member and the clutch to accommodate the movement between the body and the clutch and transmission assembly.

ORPHEUS F. QUARTULLO.